US012605906B2

(12) United States Patent　　　　(10) Patent No.:　US 12,605,906 B2
Kanagaraj et al.　　　　　　　　　　(45) Date of Patent:　　Apr. 21, 2026

(54) TOW PLACEMENT PROCESS

(71) Applicant: FABHEADS AUTOMATION PRIVATE LIMITED, Chennai (IN)

(72) Inventors: Dhinesh Kanagaraj, Chennai (IN); Akshay Ballal, Chennai (IN); Srinath Ramesh, Chennai (IN)

(73) Assignee: FABHEADS AUTOMATION PRIVATE LIMITED, Chennai (IN)

( * ) Notice: Subject to any disclaimer, the term of this patent is extended or adjusted under 35 U.S.C. 154(b) by 330 days.

(21) Appl. No.: 18/030,278

(22) PCT Filed: Aug. 6, 2021

(86) PCT No.: PCT/IN2021/050752

§ 371 (c)(1),
(2) Date: Apr. 5, 2023

(87) PCT Pub. No.: WO2022/029803

PCT Pub. Date: Feb. 10, 2022

(65) Prior Publication Data

US 2023/0391021 A1　　Dec. 7, 2023

(30) Foreign Application Priority Data

Aug. 6, 2020　(IN) .............................. 202041033723

(51) Int. Cl.
B29C 70/38　　　(2006.01)
B29C 70/54　　　(2006.01)

(52) U.S. Cl.
CPC .......... B29C 70/384 (2013.01); B29C 70/388 (2013.01); B29C 70/545 (2013.01)

(58) Field of Classification Search
None
See application file for complete search history.

(56) References Cited

U.S. PATENT DOCUMENTS

| | | | |
|---|---|---|---|
| 2015/0367576 A1 | 12/2015 | Page | |
| 2017/0021565 A1* | 1/2017 | Deaville | ............... B29C 64/165 |
| 2020/0130257 A1 | 4/2020 | Deaville | |

FOREIGN PATENT DOCUMENTS

EP　　　　3597396 A1　　1/2020

OTHER PUBLICATIONS

Written Opinion of the ISA.*

* cited by examiner

*Primary Examiner* — Christopher T Schatz
(74) *Attorney, Agent, or Firm* — Jose Cherson Weissbrot

(57)　　　　　　　ABSTRACT

The present disclosure describes a tow placement process with an extrusion mode switching. The method includes heating a roving of the desired continuous fiber material pre-impregnated with a desired matrix material; depositing said continuous fibers on a deposition surface to be steered in desired directions using a fiber placement head controlled by a computer; and said streak of fibers being steered and deposited upon each other on a layer by layer basis.

4 Claims, 10 Drawing Sheets

Driving Pulley

Idling Pulley

Path Taken with just Pull Mode

Correct Path taken with Combination mode

Intended Layup Path

Spherical balls
fit into cage

TOW PLACEMENT PROCESS

TECHNICAL FIELD

The present subject matter relates to a composite manufacturing process, and more particularly, to a method of manufacturing high strength continuous fiber-reinforced composites using an extrusion mode switching and other related characteristics.

BACKGROUND OF INVENTION

Composite materials have gained massive importance over the past few decades for its high strength to weight ratio. However, a vast majority of composite manufacturing processes in practice today are labour intensive, involve great skill and require sophisticated apparatus, which makes it expensive and limits the scope of the part in terms of its complexity.

The composite manufacturing processes as known in the art also require moulds, thereby adding up to the additional costs, and leading up to the substantial increase in lead times.

Over the years, there have been massive advancements in the field of composite manufacturing, including automated methods of placement of fibres and fabrics pre-impregnated with thermosetting resins like epoxy. The tows of the pre-impregnated fibres are fed and pressed upon a panel or die to produce 2D or 3D laminates.

U.S. Pat. No. 9,545,759 B2 describe various automated fiber placement systems and methods. The system can determine steerable paths for the application of a composite material over highly contoured surfaces. The system can determine when a course trajectory would violate a steering limitation (e.g., a maximum bend radius of the composite material) and can adjust the trajectory to avoid such violations. The adjustment can create gaps between adjacent courses, which can have a generally flared peripheral shape. The system can fill such gaps with subsequent courses of the composite material. Thus, the system can automatically apply composite material to highly contoured surfaces while also avoiding violation of the steering limitations.

U.S. Pat. No. 9,156,205 B2 describes the three dimensional printers, and reinforced filaments, and their methods of use. A void free reinforced filament is fed into an conduit nozzle. The reinforced filament includes a core, which may be continuous or semi-continuous, and a matrix material surrounding the core. The reinforced filament is heated to a temperature greater than a melting temperature of the matrix material and less than a melting temperature of the core prior to drag the filament from the conduit nozzle.

US 20140061974 A1 discloses a method and an apparatus for the additive manufacturing of three-dimensional objects. Two or more materials are extruded simultaneously as a composite, with at least one material in liquid form and at least one material in a solid continuous strand completely encased within the liquid material. A means of curing the liquid material after extrusion hardens the composite. A part is constructed using a series of extruded composite paths. The strand material within the composite contains specific chemical, mechanical, or electrical characteristics that instill the object with enhanced capabilities not possible with only one material.

U.S. Ser. No. 10/011,073 B2 describes an apparatus for manufacturing an object. The apparatus includes an extrusion head having an extrusion needle for extruding thermoplastic material associated with one or more fiber strands.

The apparatus may further include a turn-table, a more robotic arm for moving the extrusion head and needle, thermoplastic filament and fiber strand spools and thermoplastic filament and fiber strands. A controller is provided for directing the robotic arm, extrusion head and the turn-table. Further, a method for manufacturing an object includes generating a design for the object that substantially satisfies desired structural properties of the object and generating a sequence for extruding one or more beads of thermoplastic material to manufacture the object according to the design, in which the one or more beads of thermoplastic material are associated with one or more fiber strands. The one or more beads of thermoplastic material and the associated one or more fiber strands are then extruded according to the sequence.

The systems and methods as employed in state-of-the-art and currently available in the technological field of composite manufacturing generally include several limitations in the form; "requirement of moulds, the complexity of parts possible being limited, fiber steering being not possible or very limited in extent, prepregs required to be stored and operated in a controlled environment, resins suitable for prepregs being expensive, sophistication and scaling down difficulties of the machinery; resulting into the fabrication of small parts being tricky, and the final parts as manufactured requiring large amount of post processing, etc."

Therefore, there is an exigency for highly advanced and improved process or method that can solve the above mentioned problems and limitations associated with the conventional processes of composite manufacturing, thereby offering most competitive high strength continuous fiber-reinforced composites in the vastly diversified technological domain.

SUMMARY OF INVENTION

According to an embodiment of the present subject matter, a tow placement process is described herein. The tow placement process includes heating a roving of the desired continuous fiber material pre-impregnated with a thermoplastic material. The process further includes depositing the continuous fibers on a deposition surface to be steered in desired directions using a fiber placement head controlled by a computer; and the steering and depositing of the streak of fibers upon each other being on a layer by layer basis.

According to another embodiment of the present subject matter, a method of manufacturing high strength continuous fiber-reinforced composites using a numeric controlled additive process is described herein. The method includes generating toolpaths by feeding models of a desired form to a slicing software. The method further includes feeding the generated toolpaths into a controller and the controller sending signals in the form of the generated toolpaths to a plurality of motors for moving a fiber placement head in various coordinate axes. The method further includes feeding the material into a nozzle upon a print head moving to the desired position, with the nozzle being fed with the material using an extruder in an engaged position until the material adheres to the previous layer. The method further includes providing the nozzle with a heating element towards the end facilitating in the melting and smooth flow of the material exiting from nozzle outlet, thereby ensuring greater adhesion with underlying layers. The method further requires disengagement of the extruder upon ensuring adhesion between different layers generated during print process, so as to allow for smooth flow of filament and eliminating any possibilities of a mismatch in velocity. The method further includes cutting of the fiber at the end of a layer or at a discontinuity within the layer and restarting layup at a new point.

The preceding is a simplified summary to provide an understanding of some aspects of embodiments of the present subject matter. This summary is neither an extensive nor exhaustive overview of the present subject matter and its various embodiments. The summary presents selected concepts of the embodiments of the present subject matter in a simplified form as an introduction to the more detailed description presented below. As will be appreciated, other embodiments of the present subject matter are possible utilizing, alone or in combination, one or more of the features set forth above or described in detail below.

BRIEF DESCRIPTION OF ACCOMPANYING DRAWINGS

For the purposes of illustration, there are shown in the drawings certain embodiments of the present subject matter. It should be understood, however, that the subject matter is not limited to the precise arrangements, dimensions, and mechanisms represented. Further, like numerals indicate like elements throughout the drawings.

DETAILED DESCRIPTION OF INVENTION

As used throughout this application, the word "may" is used in a permissive sense (i.e., meaning having the potential to), rather than the mandatory sense (i.e., meaning must). Similarly, the words "include", "including", and "includes" mean including but not limited to.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The present subject matter may have a variety of modifications and may be embodied in a variety of forms, and specific embodiments will be described in more detail with reference to the drawings. It should be understood, however, that the embodiments of the present subject matter are not intended to be limited to the specific forms, but include all modifications, equivalents, and alternatives falling within the spirit and scope of the present subject matter.

Figure 1:
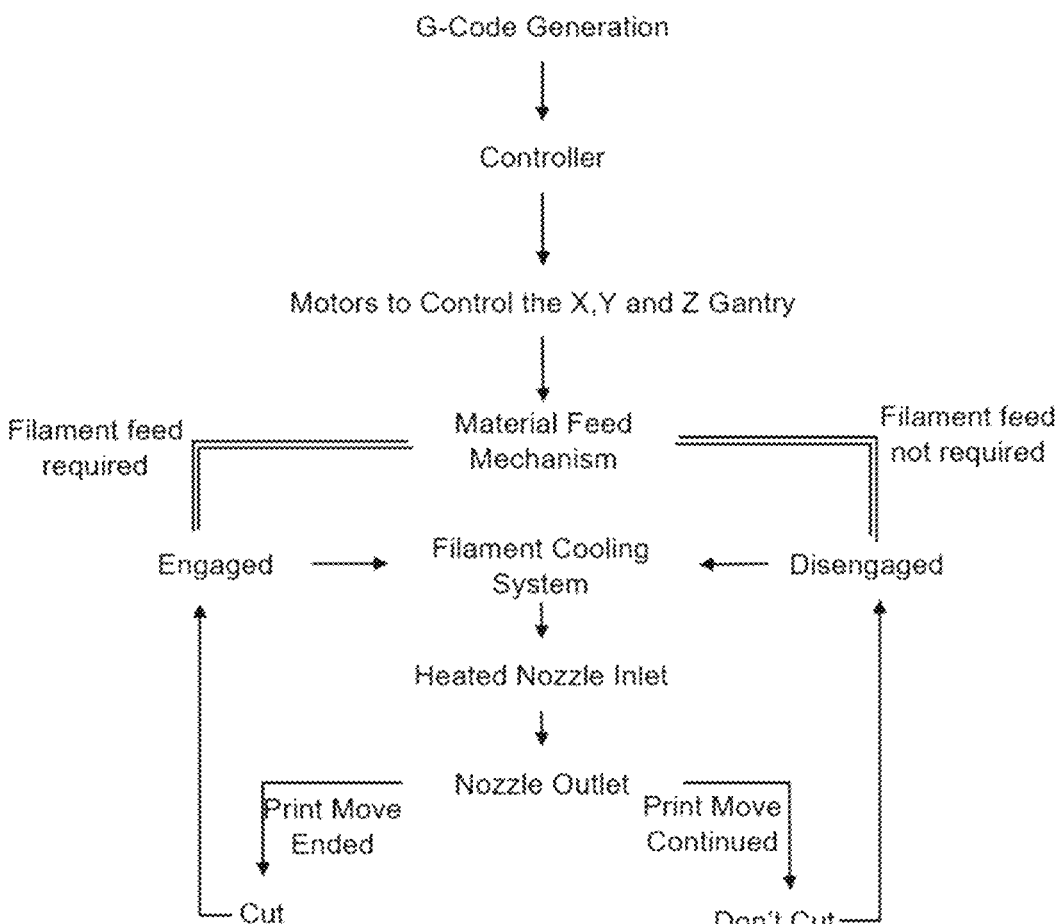
FIG. 1 represents a flowchart of a method of manufacturing high strength continuous fiber-reinforced composites in accordance with an embodiment of the present subject matter.

Referring to FIG. 1, a flowchart highlights the sequence of steps employed in the method of manufacturing high strength continuous fiber-reinforced composites by a numeric controlled additive process. According to an embodiment of the present subject matter, the toolpaths are generated by feeding models of a desired form to a slicing software. The feeding models could be, for example, tessellated models, or any other suitable models of the kind and form as required in the manufacturing process and perceived by the person skilled in the art.

The toolpaths as generated are fed into a controller for further sending signals in the form of the generated toolpaths to a plurality of motors for moving a fiber placement head in various coordinate axes, namely, X, Y, Z, and normal to a deposition surface.

Figure 2:
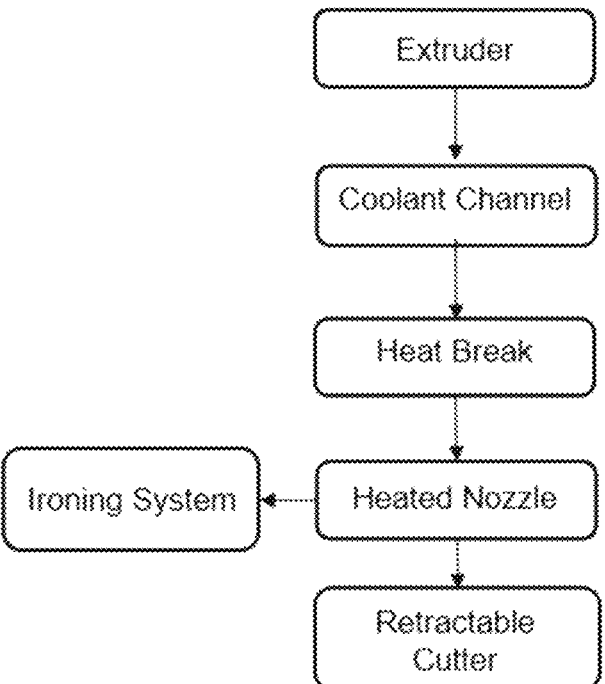
FIG. 2 represents a flowchart of the component layout of a print head in accordance with an embodiment of the present subject matter.

According to an embodiment of the present subject matter, the component layout of a print head as employed and described herein in the context of the present subject matter is in the form as shown in the flowchart under FIG. 2. The print head include the components, namely, an extruder (with engage/disengage mechanism), a coolant channel or a cooling system, a heated nozzle with an integrated ironing system, and a retractable cutter.

Referring to the flowchart of FIG. 1, the method further includes the step of feeding the material into the nozzle and starting the printing process with the print head moving to the desired position. The nozzle is fed with the material using the extruder in an engaged position until the material adheres to the print platform.

Figure 3:
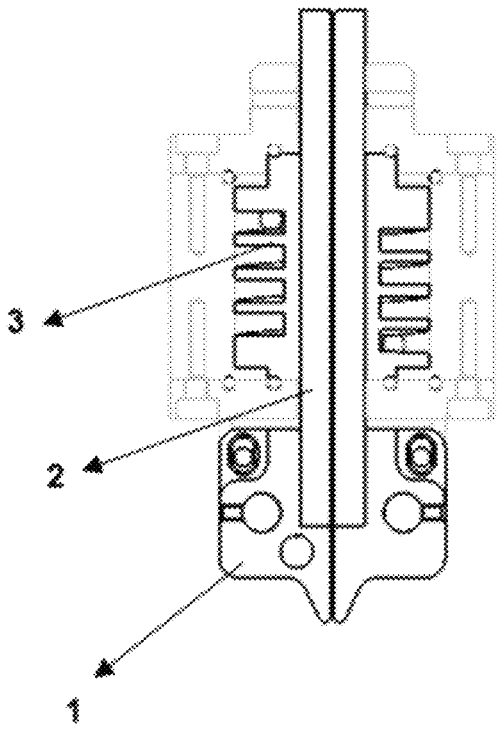
FIG. 3 represents a cross-section of a layup nozzle in accordance with an embodiment of the present subject matter.

The layup nozzle is modular and can be swapped easily for performing layup with different widths of tapes and also round filament. The component (1) along with the component (2) of the layup nozzle can be removed out of the component (3), as shown in FIG. 3. The different set of components (1) and (2) can be replaced for performing layup with different widths of the tape. This characteristic arrangement and configuration of the layup nozzle helps make the whole print head more economical in operations and the same head can be used for different forms of towpregs.

According to another embodiment of the present subject matter, the print head involves the use of two nozzles i.e., one for purely thermoplastic material and the other for fiber reinforced thermoplastic material. In an alternative embodiment, there is an injection of thermoplastic material into the nozzle through an entry point in the heated portion of the print head.

The provision for thermoplastic material printing helps in varying the volume fraction of carbon fiber in the fiber reinforced part. The base layer of the thermoplastic material is printed before the fiber reinforced filament is laid up for optimal adhesion.

It is further in accordance with an embodiment of the present subject matter that the nozzle is provided with a heating element towards the end, thereby facilitating in the melting and smooth flow of the material exiting from the nozzle outlet and ensuring greater adhesion with the underlying layers. Once adhesion is ensured between different layers generated during the printing process, the extruder is disengaged to allow for smooth flow of filament, thereby eliminating any possibilities of mismatch in velocity. The extruder remains disengaged during the printing operation. This prevents unwanted tensioning of the filament due to velocity mismatch, extruder slippage etc., which could lead to fiber pullout from the part, nozzle clogging and even filament breakage.

Figure 4:
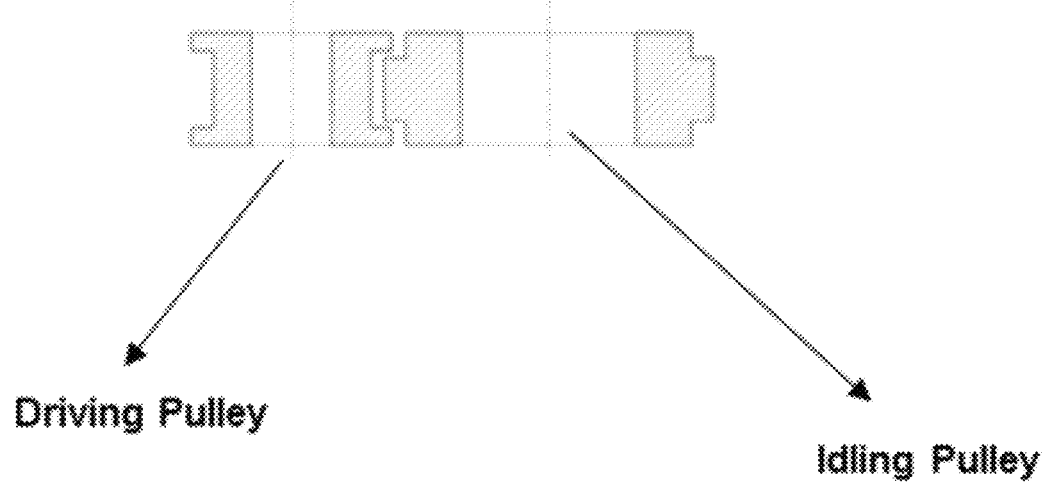
FIG. 4 is a representation of mated extruding pulleys in accordance with an embodiment of the present subject matter.

According to an embodiment of the present subject matter, the extruder can accept the tows in various forms including round filament and tapes. This is made possible using mated extruding pulleys which do not allow the filament to slip out during extrusion operation, as shown in FIG. 4.

Figure 5A:
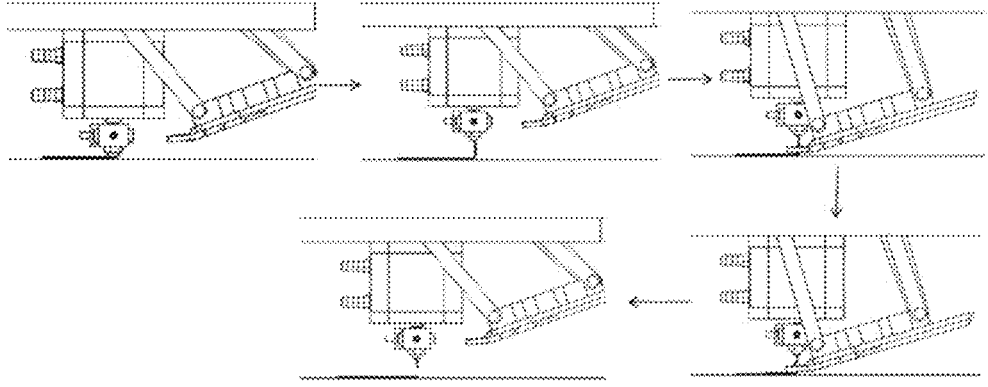
FIGS. 5A and 5B, illustrate representation of the sequence of steps performed in the cutting operation or the positioning of a retractable cutter during the printing process via the movement of the apparatus (5A) as well as via the path of a fibre (5B), in accordance with an embodiment of the present subject matter.
Figure 5B:
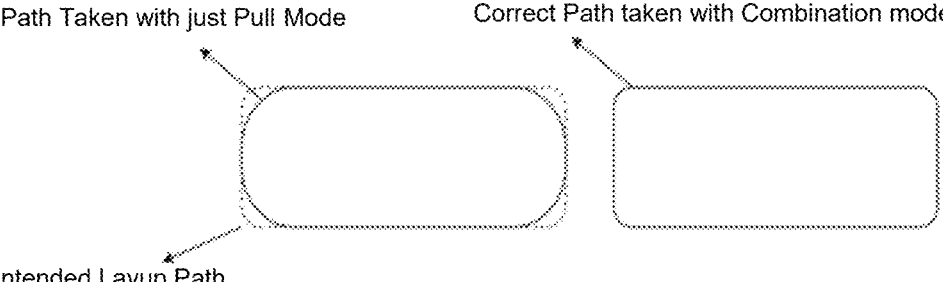

Furthermore, the extruder as described in accordance with an embodiment of the present subject matter employs multiple modes of extrusion with automatic switching based on the complexity and speed of layup. The different modes of extrusion are a) push mode which comes into use at the time of feeding the new material, when the fiber is pushed through the nozzle, and during the cutting operation, when fiber is again pushed to release tension thereto; b) pull mode that is used for straight line layups, when the extruder is disengaged to allow for faster layup speeds; and c) combination mode that is used during the curved sections, wherein the fiber is both pushed and pulled to improve precision during steering. As shown in the image on the left in FIGS. 5A and 5B, in pure pull mode of the extruder, when the layup is being done on a curved trajectory, the tension in the fiber causes the fiber to slip towards the center of the curve. This results in an imprecise layup. To counter this issue, a combination of push and pull is used for such parts. Along the straight paths, pull mode configuration allows for faster deposition. Along the curved section of the path, push mode actively releases the tension in the fiber by continuously extruding the right amount of filament such that the filament is laid up exactly where it needs to be, thereby increasing the precision of the final part, as shown in right side of FIGS. 5A and 5B.

Further, the cutting of the fiber at the end of the layer or at the point of discontinuity within the layer takes place and the excess filament is retracted using the extruder, thereby completing the cycle of the printing process and restarting layup at a new point.

According to an embodiment of the present subject matter, the cutting mechanism integrated with the print head is essentially a 4-bar linkage mechanism, with one of the links driven by a rotary actuator. One of the links has a cutter attached to it. The cutter may be a blade or a pair of shear cutters, as can be best perceived by a person skilled in the art, and is activated remotely through the controller.

Figure 6:
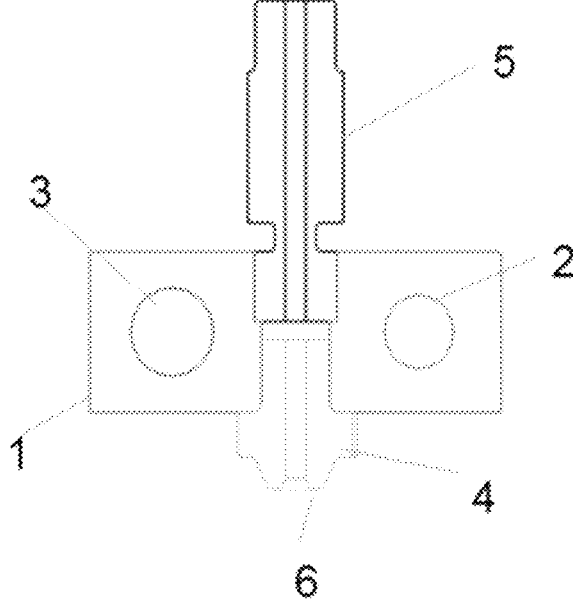
FIG. 6 represents a schematic of an ironing arrangement integrated with the layup nozzle in accordance with an embodiment of the present subject matter.

Referring to FIG. 6, during the print operation, the cutter stays above the nozzle, such that the path is not impeded and the underlying layers are not affected. At the end of the print operation, the print head or only the nozzle moves up; the 4-bar linkage is actuated and the cutter comes below the nozzle; the cutting operation takes place using the kind of the cutter employed thereto; and the linkage is actuated again with the cutter moving back up and the excess filament being retracted using the extruder, resulting into the completion of the printing cycle and resuming the process thereafter.

Figure 7:
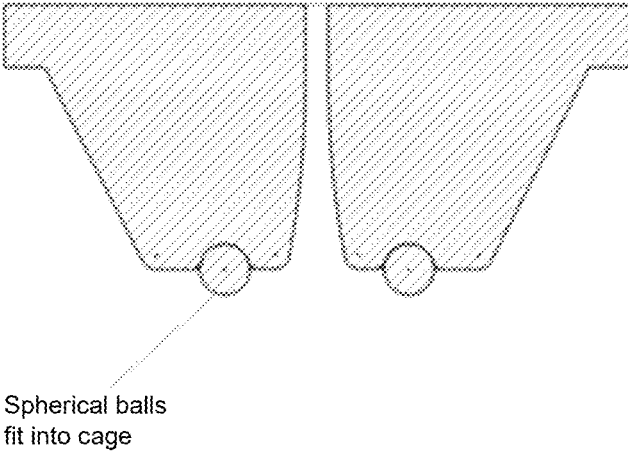
FIG. 7 represents an isometric view of the spherical balls type ironing arrangement integrated with the layup nozzle in accordance with an embodiment of the present subject matter.

Referring FIG. 7, it is in accordance with an embodiment of the present subject matter that the nozzle (4) is provided with an ironing arrangement (6) at the end. The arrangement is a spherical-profiled attachment at the end of the nozzle facilitating smooth flow of filament during the extrusion process and presses on to the extruded filament to ensure greater adhesion to the underlying layers.

Figure 8:
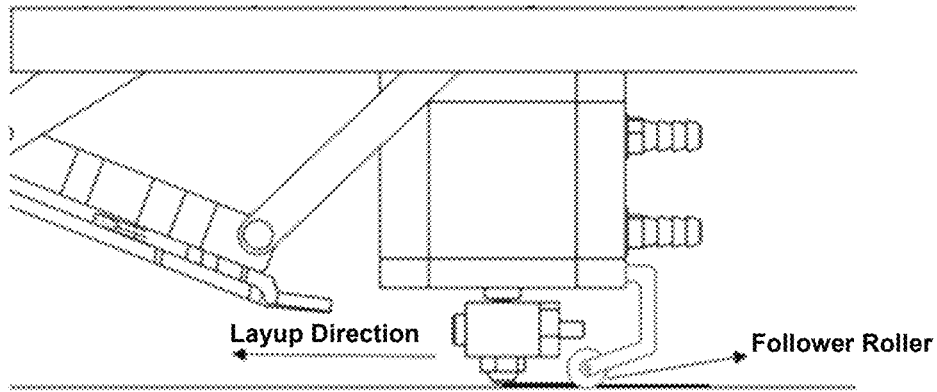
FIG. 8 represents a schematic of a follower roller in accordance with an embodiment of the present subject matter.

Alternately, according to an embodiment of the present subject matter, the ironing arrangement (6) can be a set of spherical balls arranged in a radial fashion along the outlet, held together in a cage machined into the outlet, as shown in FIG. 8. The design of the ironing arrangement (6) will take into account the effects of thermal expansion due to heating.

Figure 9:
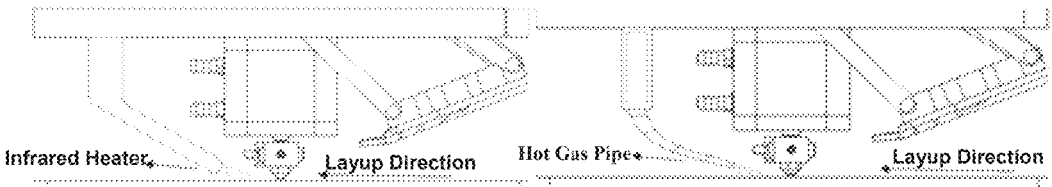
FIG. 9 represents a schematic of an additional/auxiliary heater in accordance with an embodiment of the present subject matter.

As shown in FIG. 9, a follower roller compacts the deposited tow onto the previously deposited layers according to an embodiment of the present subject matter. This helps in removing any air voids that are caused during the layup. This can also produce better adhesion with the previous layup resulting in a higher interlaminar shear strength of the produced part reducing delamination failures.

Furthermore, in accordance with an embodiment of the present subject matter, a focused heating element, in addition to the heating element present in the nozzle for melting the matrix present in the towpreg, is mounted on the leading side of the layup direction, as shown in FIG. 10. The additional heating element softens the previous layer which promotes the adhesion of the newly deposited tow over it.

According to an embodiment of the present subject matter, the additional heating element can either be hot gas or an infrared heater or a laser heater placed close to the nozzle, as can be best perceived by a person skilled in the art. The whole head can be rotated about the nozzle axis to keep the heaters oriented so that they are always leading the layup direction.

According to a further embodiment of the present subject matter, there is described a tow placement process employing the technique wherein continuous fibers dispersed in a thermoplastic matrix are heated, deposited on a bed and steered in the desired directions using a fiber placement head controlled by a computer. The fibers will be steered and deposited upon each other, on a layer by layer basis. The heat supplied to the filament will be sufficient to melt the thermoplastic matrix and therefore, will bond with the underlying layer. This allows for the manufacturing of complex composite parts at reduced costs, eliminating the need for moulds and the skilled labour.

Furthermore, in accordance with an embodiment of the present subject matter, the material used for the fabrication of fiber reinforced filament is essentially a roving of the desired continuous fiber material pre-impregnated with a desired matrix material such as a thermoplastic of thermosetting material of the desired choice. The cross section may be circular, rectangular or any other shape, depending on the feed system and the output desired. In addition, the selection of the thermoplastic material is dependent on the properties such as, strength, ductility, thermal resistance, chemical resistance, etc., as required and desired in the process.

The foregoing discussion of the present subject matter has been presented for purposes of illustration and description. It is not intended to limit the present subject matter to the form or forms disclosed herein. In the foregoing Detailed Description, for example, various features of the present subject matter are grouped together in one or more embodiments, configurations, or aspects for the purpose of streamlining the disclosure. The features of the embodiments, configurations, or aspects may be combined in alternate embodiments, configurations, or aspects other than those discussed above. This method of disclosure is not to be interpreted as reflecting an intention the present subject matter requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate embodiment of the present subject matter.

Moreover, though the description of the present subject matter has included description of one or more embodiments, configurations, or aspects and certain variations and modifications, other variations, combinations, and modifications are within the scope of the present subject matter, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A tow placement process comprising the steps:

heating a roving of a desired continuous fiber material pre-impregnated with a desired matrix material;

depositing the roving on a deposition surface to be steered in desired directions using a fiber placement head that is controlled by a computer;

steering the roving and depositing the steered roving upon each other on a layer by layer basis; and feeding the roving into a nozzle using an extruder, wherein the extruder having a plurality of modes of extrusion with an automatic switching such that the extruder is disengaged to allow uninterrupted flow of the roving, wherein the plurality of modes of extrusion with the automatic switching comprises:

(a) a push mode used at a time of (i) feeding the roving, when the roving is pushed through the nozzle, and (ii) during a cutting operation, when the roving is again pushed to release tension thereto, (b) a pull mode used for manufacturing straight line layups, when the extruder is disengaged to allow for faster layup speeds, and (c) a combination mode used for manufacturing curved sections, wherein the roving is both pushed and pulled during the steering, and extruding using at least one of the plurality of modes of extrusion.

2. The tow placement process as claimed in claim 1, wherein a cross section of the roving is circular, rectangular or any other shape.

3. The tow placement process as claimed in claim 1, wherein selection of the desired matrix material is based on one or more material properties, including strength, ductility, thermal resistance, and chemical resistance.

4. The tow placement process as claimed in claim 1, wherein the desired matrix material is selected from thermoset or thermoplastic material.

* * * * *